United States Patent

Brooks

[15] 3,680,245
[45] Aug. 1, 1972

[54] FISH ATTRACTING DEVICE
[72] Inventor: Ray G. Brooks, Irving, Tex.
[73] Assignee: Product Promotions, Inc., Dallas, Tex.
[22] Filed: Oct. 1, 1970
[21] Appl. No.: 77,209

[52] U.S. Cl. .....................43/17.1, 43/17.5, 43/44.99
[51] Int. Cl. .............................................A01k 97/00
[58] Field of Search........43/17.5, 17.1, 44.99, 43.11, 43/27.4, 54.5, 41

[56] References Cited

UNITED STATES PATENTS 842,540   1/1907   Fleming.......................43/43.11
1,192,001 7/1916  Ryan.............................43/17.5
3,079,721 3/1963  Smith............................43/17.5
3,510,978 5/1970  Murdock.......................43/17.5

Primary Examiner—Warner H. Camp
Attorney—Robert G. McMorrow

[57] ABSTRACT

A module incorporating multiple attraction media for aquatic animals is suspended from a housing having a storage area for the module and a housing for the energy source. The storage area and housing are interconnected by a reel for storage of a cord connecting the module and the housing, said reel having a cover slidably engaged with the housing and movable thereon.

4 Claims, 6 Drawing Figures

PATENTED AUG 1 1972

INVENTOR
RAY G. BROOKS

BY *Robt J. Willonow*
ATTORNEY

FISH ATTRACTING DEVICE

BACKGROUND OF THE INVENTION

1. Field of the Invention

This invention relates to devices for attraction of aquatic life to the area of a boat, a dock, or the like. More particularly, the invention comprehends a means for attracting fish through visual, auditory and odor perception senses.

2. Statement of Prior Art

It has heretofore been proposed to attract fish through suspended or trolled devices emitting sounds, and the like. Illustrative of these devices are those shown in the following U.S. Pats.:

| Patent No. | Patentee | Issue Date |
| --- | --- | --- |
| 1,915,208 | Walthers | June 20, 1933 |
| 2,757,475 | Pankove | Aug. 7, 1956 |
| 2,784,399 | Smith | Mar. 5, 1957 |
| 2,920,318 | Balcken et al | Jan. 5, 1960 |
| 2,939,240 | Goodman | June 7, 1960 |
| 3,105,233 | D'Amore et al | Sept. 24, 1963 |
| 3,310,902 | Godby | Mar. 28, 1967 |
| 3,382,598 | Wilson | May 14, 1968 |
| 3,416,254 | Bornzin | Dec. 17, 1968. |

SUMMARY OF THE INVENTION

The present invention incorporates, in a single convenient unit, means for attracting fish by sound, light and food. Moreover, the unit is of a compact form, and efficiently stores both a submersible unit module and the suspending cord means when these components are not in use. It is therefore a principal objective of the invention to provide an efficient means for combining the fish attracting attributes of light, sound and food in a single unit.

The invention proposes a construction wherein the means for incorporation of the sound and light producing means is conveniently housed in a unit assembly. Further structural innovations will become clear from a consideration of the following specification when read in conjunction with the annexed drawings.

DESCRIPTION OF THE PREFERRED EMBODIMENT

Figure 1:
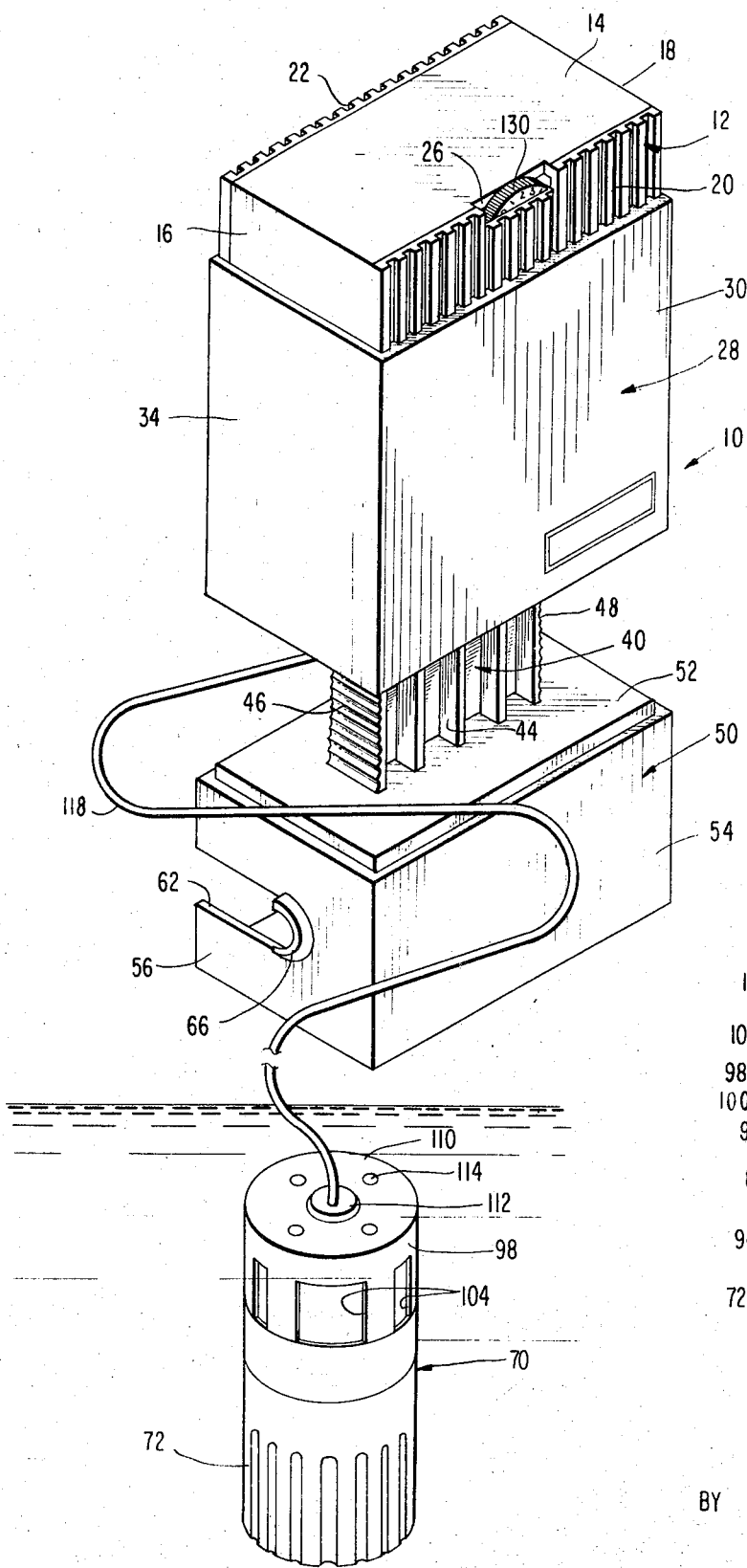
FIG. 1 is a perspective view of a fish attracting device constructed and assembled in accordance with the present invention.

Referring to the drawing in more detail, a fish attracting device according to this invention is therein disclosed and generally identified by reference numeral 10. The device 10 includes a first housing 12 formed of plastic or similar material, and of box-like form. The first housing has a flat top wall 14, end walls 16, 18, and side walls 20, 22 having vertically extending slots and ridges thereon. The housing has a base wall 24. The side wall 20, and top wall 14 are mutually slotted at 26, for purpose appearing below. A cover 28 is slidably engaged on the first housing. The cover has front and back panels 30, 32 and side panels 34, 36, and it is to be noted that the back panel 32 is provided with a lower tab 38. The front and back panels have vertically directed ridges which interfit with the vertical slots of the housing, thereby permitting the slidable engagement of the cover on the housing.

Depending from the base wall 24 of the first housing is an elongated member 40 comprising a line storage reel. The member 40 includes a central rib 42 having a series of outer ribs 44, and having end ribs 46. The end ribs are formed with a continuous series of indentations 48 thereon which enhance the ability of the reel to spool and store line thereon. Secured to the member 40 at the extremity thereof opposite the first housing is a second housing 50. The housing 50 has proximal wall 52 to which the member 40 is connected, a back wall 54, side walls 56, 58, and a bottom 60. The front of the second housing is open, and the side walls 56 and 58 have forwardly opening, longitudinal slots 62, respectively, formed therein. Each of these slots has an enlarged protector, 66, 68 at its inward terminus.

Figure 4:
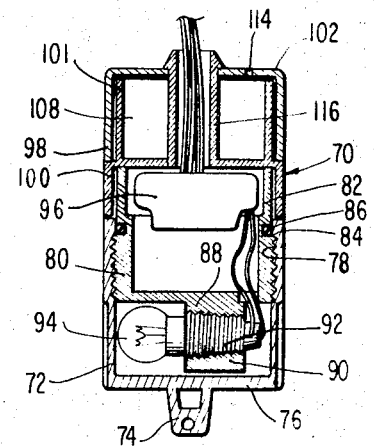
FIG. 4 is a sectional view taken through the submersable module hereof.
Figure 2:
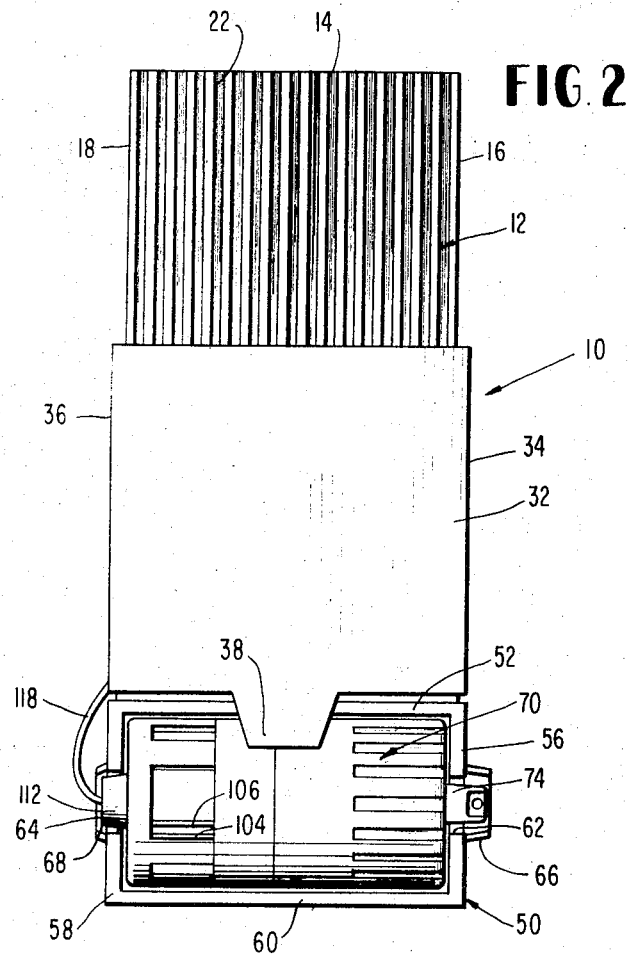
FIG. 2 is a frontal elevation of the device.

A submersible module 70 is removably contained in the second housing 50. In construction, the module 70 comprises a lower cup member 72 formed of transparent or translucent plastic or equivalent material and having a striated outer body section. The cup member 72 further has an apertured fitting 74 on its end wall 76 to permit the suspension of a weight, such as a fishing sinker, therefrom. The mouth of the section 72 is internally threaded, as at 78, to receive a water tight closure 80 which is externally threaded for this purpose. The closure is itself cup shaped, and includes a side wall portion 82 which extends substantially above the cup member 72. The wall has a circumferential slot at 84 receiving a resilient o-ring 86 further enhancing the water tight characteristics thereof. Depending from the base 88 of the cup shaped closure 80 is a block 90 which is bored to receive an electrical receptacle 92 for a light blub 94 of the incandescent variety. Further housed in the closure 80 is an electrically energized speaker 96 of any known construction and operation which includes the means for the emission of sounds therefrom. These sounds may approximate that of an injured insect, or other sounds, as may be dictated by the type of fish to be attracted. The module 90 further includes an upper cap assembly 98 composed of an inner member 100 with a reduced top section 101 and an outer member 102. Both of these members have ports 104 and 106 respectively, which are alignable for maximum access to a food storage compartment 108, or may be misaligned to close or partially close that compartment. The cap 98 has a top 110 with a central boss 112 permitting a line to extend therethrough, and having a series of openings 114 to the compartment 108. In FIG. 4, it will be observed that a tubular cord passage member 116 extends through the compartment 108 to the apertured boss 112.

Figure 3:
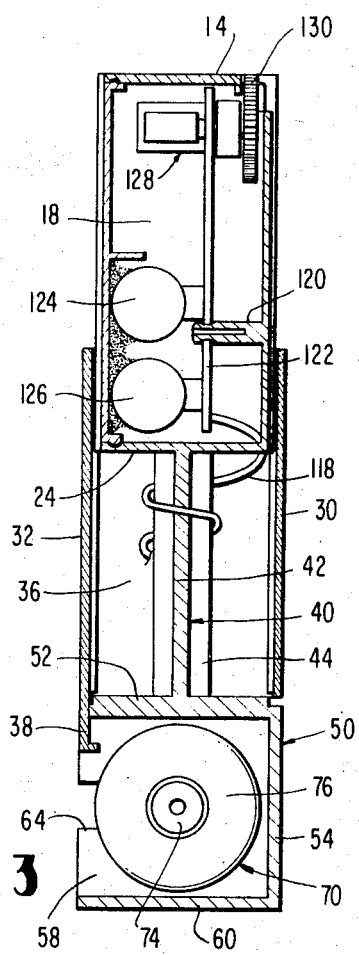
FIG. 3 is a medial cross sectional view of the device.
Figure 5:
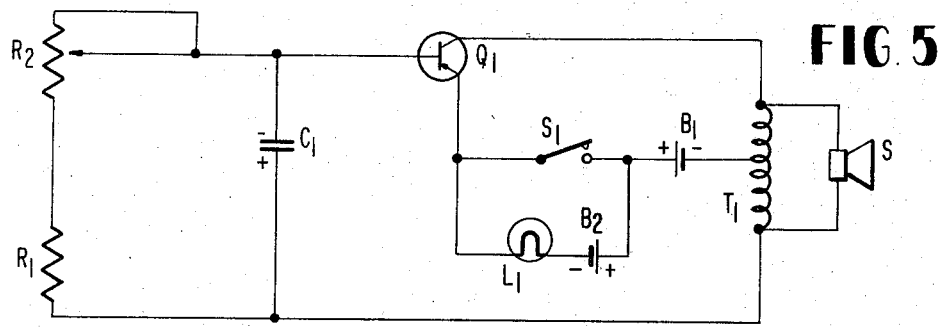
FIG. 5 is a first typical electrical circuit for the device.
Figure 6:
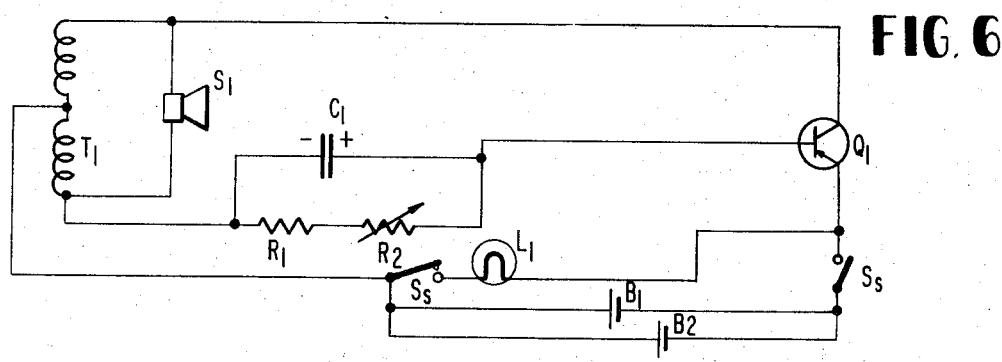
FIG. 6 is a modified circuit therefor.

An elongated electrical cord 118, having multiple line components, extends from the light and speaker to the first housing, extending through the latter through an opening provided in the base wall 24 thereof (see FIG. 3). Housed within the first housing on an insulating pedestal 120 is a conductive strap 122 to which the cord 118 is suitably secured. A pair of batteries 124, 126 are mounted on the strap in electrically conductive fashion, and the strap also carries a variable switch assembly 128 having a knob 130 which extends through the housing at the slotted portion 26. The knob controls both the on/off energization of the speaker and light, and the amount of energy supplied to each, thereby controlling the intensity of the light and sound emitted from the module. FIGS. 5 and 6 illustrate preferred electrical circuits for establishing electrical contact between the components, in two non limiting examples. In the former, $B_1$ and $B_2$ represent the battery power source while $S_1$ is the switch, preferably of the potentiometer type. A transistor $Q_1$, resistor $R_1$ and potentiometer $R_2$, with a capaciter $C_1$ complete the operating components of the circuit to energize the lamp $L_1$ and speaker 5 through the transformer $T_1$. In the alternative circuit of FIG. 6, the lamp $L_1$ and speaker $S_1$, including the transformer $T_1$ for the speaker are energized by batteries $B_1$ and $B_2$ in a circuit including resistors $R_1$ and $R_2$, a PNP transistor $Q_1$ and a capaciter $C_1$. Suitable switches $S_s$ are provided. As indicated above, other and different wiring arrangements may be substituted for these without departure from the invention.

The device is stored when not in use with the cord 118 would about the member 40, and encased by the cover wound Preparatory to use, the cover 28 is moved upwardly to expose the cord, and a length of cord equivalent to the desired depth of suspension of the module is unspooled. A suitable weight is attached to the fitting 74 and food or bait is placed in the compartment 108 which is then partially closed to an extent such that the bait is entrapped therein. The module is lowered into the water, and the light and speaker, are activated through the manipulation of the knob 130. Appropriate fishing gear, such as baited hooks, is then suspended to an equal depth adjacent the attracting device.

I claim:
1. A fish attracting device comprising:
a first housing having outer walls forming a compartment therein;
battery means disposed in the compartment;
a cover slidably mounted on the housing;
a second housing having an open side;
an elongated member, comprising a cord storage rack, extending between and joining the first and second housings, the cover being slidable to a position in which it encloses the rack;
a submersible module stored in the second housing and removable therefrom through the open side thereof;
the module having an incandescent bulb housed therein and having lens means to emit light from said bulb;
a sound emitting device in the module;
a cord means for supplying energy from the batteries to the bulb and the sound emitting device and for suspending the module from the housing; and
the module having a food compartment therein.
2. The invention of claim 1, wherein:
the module includes a multi-section cap about said food compartment; and
the sections of the cap are relatively movable and have alignable openings therein.
3. The invention of claim 1, wherein:
the cord storage rack has a pair of opposite end ribs; and
the ribs have indentations therein.
4. The invention of claim 1, wherein:
the first housing outer walls have a series of ribs and slots therein; and
the cover has inwardly directed ribs with interspersed slots engaged with the respective ribs and slots of the first housing.

* * * * *